United States Patent
Pekcan et al.

(10) Patent No.: US 9,444,757 B2
(45) Date of Patent: Sep. 13, 2016

(54) DYNAMIC CONFIGURATION OF PROCESSING MODULES IN A NETWORK COMMUNICATIONS PROCESSOR ARCHITECTURE

(75) Inventors: Hakan I. Pekcan, Basking Ridge, NJ (US); Steven J. Pollock, Allentown, PA (US); Jerry Pirog, Easton, PA (US)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 13/192,140

(22) Filed: Jul. 27, 2011

(65) Prior Publication Data

US 2011/0289179 A1   Nov. 24, 2011

Related U.S. Application Data

(63) Continuation-in-part of application No. 12/782,379, filed on May 18, 2010, now Pat. No. 9,081,742, and a continuation-in-part of application No. 12/782,393, filed on May 18, 2010, now Pat. No. 8,255,644, and a (Continued)

(51) Int. Cl.
*H04L 12/873* (2013.01)
*H04L 12/931* (2013.01)
(Continued)

(52) U.S. Cl.
CPC ............ *H04L 47/522* (2013.01); *H04L 49/65* (2013.01); *G06F 12/084* (2013.01); *G06F 12/0811* (2013.01); *H04L 47/622* (2013.01)

(58) Field of Classification Search
USPC ........................................................ 370/411
See application file for complete search history.

(56) References Cited

U.S. PATENT DOCUMENTS

| 4,123,795 A | 10/1978 | Dean et al. |
| 4,622,631 A | 11/1986 | Frank et al. |

(Continued)

FOREIGN PATENT DOCUMENTS

| JP | H02-271444 | 11/1990 |
| JP | H02 -271444 A | 11/1990 |

OTHER PUBLICATIONS

Office action from U.S. Appl. No. 12/782,379, mailed Jan. 22, 2013, 7 pages.

(Continued)

*Primary Examiner* — Thomas L Mansfield, Jr.
(74) *Attorney, Agent, or Firm* — Nicholson De Vos Webster & Elliott LLP

(57) ABSTRACT

Described embodiments provide a method of updating configuration data of a network processor having one or more processing modules and a shared memory. A control processor of the network processor writes updated configuration data to the shared memory and sends a configuration update request to a configuration manager. The configuration update request corresponds to the updated configuration data. The configuration manager determines whether the configuration update request corresponds to settings of a given one of the processing modules. If the configuration update request corresponds to settings of a given one of the one or more processing modules, the configuration manager, sends one or more configuration operations to a destination one of the processing modules corresponding to the configuration update request and updated configuration data. The destination processing module updates one or more register values corresponding to configuration settings of the processing module with the corresponding updated configuration data.

14 Claims, 7 Drawing Sheets

Related U.S. Application Data continuation-in-part of application No. 12/782,411, filed on May 18, 2010, now Pat. No. 8,407,707.

(60) Provisional application No. 61/421,243, filed on Dec. 9, 2010, provisional application No. 61/426,857, filed on Dec. 23, 2010.

(51) Int. Cl.
*G06F 12/08* (2016.01)
*H04L 12/863* (2013.01)

(56) References Cited

U.S. PATENT DOCUMENTS

| | | | |
|---|---|---|---|
| 4,805,098 A | 2/1989 | Mills et al. | |
| 5,500,948 A | 3/1996 | Hinton et al. | |
| 5,623,698 A | 4/1997 | Stephenson et al. | |
| 5,689,506 A | 11/1997 | Chiussi et al. | |
| 5,815,727 A | 9/1998 | Motomura | |
| 5,857,087 A | 1/1999 | Bemanian et al. | |
| 5,875,466 A | 2/1999 | Wakerly | |
| 5,892,766 A | 4/1999 | Wicki et al. | |
| 5,920,539 A | 7/1999 | Schell et al. | |
| 5,943,283 A | 8/1999 | Wong et al. | |
| 6,026,467 A | 2/2000 | Petty | |
| 6,038,630 A | 3/2000 | Foster et al. | |
| 6,195,335 B1 | 2/2001 | Calvignac et al. | |
| 6,240,492 B1 | 5/2001 | Foster et al. | |
| 6,275,913 B1 | 8/2001 | Jeddeloh | |
| 6,381,668 B1 | 4/2002 | Lunteren | |
| 6,445,705 B1 | 9/2002 | Holden et al. | |
| 6,456,510 B1* | 9/2002 | Patel et al. | 363/21.06 |
| 6,487,643 B1 | 11/2002 | Khare et al. | |
| 6,507,928 B1 | 1/2003 | Richardson | |
| 6,515,965 B1 | 2/2003 | Hou et al. | |
| 6,557,084 B2 | 4/2003 | Freerksen et al. | |
| 6,567,564 B1 | 5/2003 | van der Wal | |
| 6,584,546 B2 | 6/2003 | Kavipurapu | |
| 6,636,932 B1 | 10/2003 | Regev et al. | |
| 6,643,747 B2 | 11/2003 | Hammarlund et al. | |
| 6,694,410 B1 | 2/2004 | Dang | |
| 6,697,882 B1 | 2/2004 | Matsui | |
| 6,839,797 B2 | 1/2005 | Calle et al. | |
| 6,868,459 B1 | 3/2005 | Stuber | |
| 6,874,052 B1 | 3/2005 | Delmonico | |
| 6,938,138 B2 | 8/2005 | Beukema et al. | |
| 6,999,413 B2 | 2/2006 | Moriwaki et al. | |
| 7,031,985 B1 | 4/2006 | Pecheny | |
| 7,089,346 B2 | 8/2006 | Cebulla et al. | |
| 7,162,590 B2* | 1/2007 | Pruvost et al. | 711/147 |
| 7,181,556 B2 | 2/2007 | Gwilt | |
| 7,200,837 B2 | 4/2007 | Stevens | |
| 7,234,018 B1 | 6/2007 | Purcell et al. | |
| 7,248,585 B2 | 7/2007 | Kohn et al. | |
| 7,272,705 B2 | 9/2007 | Revilla et al. | |
| 7,287,255 B2 | 10/2007 | Potter, Jr. | |
| 7,289,964 B1 | 10/2007 | Bowman-Amuah | |
| 7,293,142 B1 | 11/2007 | Xu et al. | |
| 7,302,542 B1 | 11/2007 | Cantrill | |
| 7,321,965 B2 | 1/2008 | Kissell | |
| 7,415,540 B2 | 8/2008 | Fallon et al. | |
| 7,461,187 B2 | 12/2008 | Morishita et al. | |
| 7,461,208 B1 | 12/2008 | Caprioli et al. | |
| 7,475,182 B2 | 1/2009 | Matsuse et al. | |
| 7,487,321 B2 | 2/2009 | Muthiah et al. | |
| 7,549,024 B2* | 6/2009 | Piry et al. | 711/141 |
| 7,551,617 B2 | 6/2009 | Eatherton et al. | |
| 7,596,142 B1 | 9/2009 | MacAdam | |
| 7,610,473 B2 | 10/2009 | Kissell | |
| 7,623,543 B2 | 11/2009 | Su et al. | |
| 7,650,453 B2 | 1/2010 | Torii | |
| 7,676,613 B2 | 3/2010 | Bashford et al. | |
| 7,707,367 B1 | 4/2010 | Tran et al. | |
| 7,710,988 B1 | 5/2010 | Tripathi et al. | |
| 7,778,815 B2 | 8/2010 | Pasricha et al. | |
| 7,809,701 B2 | 10/2010 | Blake | |
| 7,822,906 B2 | 10/2010 | Fan et al. | |
| 7,826,434 B2 | 11/2010 | Goldrian et al. | |
| 7,917,676 B2 | 3/2011 | Sullivan et al. | |
| 7,934,046 B2 | 4/2011 | Butter et al. | |
| 7,991,928 B2 | 8/2011 | Keller et al. | |
| 8,006,021 B1 | 8/2011 | Li et al. | |
| 8,041,867 B2 | 10/2011 | Lin | |
| 8,135,926 B1 | 3/2012 | Glasco et al. | |
| 8,171,186 B1 | 5/2012 | Karguth et al. | |
| 8,243,737 B2 | 8/2012 | Zhou et al. | |
| 8,255,644 B2 | 8/2012 | Sonnier et al. | |
| 8,321,385 B2 | 11/2012 | Burroughs | |
| 8,352,669 B2 | 1/2013 | Wu et al. | |
| 8,370,806 B2 | 2/2013 | Codrescu et al. | |
| 8,392,663 B2* | 3/2013 | Kinter et al. | 711/141 |
| 8,407,707 B2 | 3/2013 | Sonnier et al. | |
| 8,473,657 B2 | 6/2013 | Zhou et al. | |
| 8,489,791 B2 | 7/2013 | Byrne et al. | |
| 8,489,792 B2 | 7/2013 | Byrne et al. | |
| 8,489,794 B2 | 7/2013 | Byrne et al. | |
| 8,499,137 B2 | 7/2013 | Hasting et al. | |
| 8,505,013 B2 | 8/2013 | Pollock et al. | |
| 8,514,874 B2 | 8/2013 | Mital et al. | |
| 8,537,832 B2 | 9/2013 | Pirog et al. | |
| 8,539,199 B2 | 9/2013 | Burroughs et al. | |
| 8,868,889 B2 | 10/2014 | Mital et al. | |
| 8,910,171 B2 | 12/2014 | Mital et al. | |
| 8,935,483 B2 | 1/2015 | Pirog | |
| 8,943,507 B2 | 1/2015 | Mital et al. | |
| 9,081,742 B2 | 7/2015 | Sonnier et al. | |
| 9,183,145 B2 | 11/2015 | Sonnier et al. | |
| 9,218,290 B2 | 12/2015 | Sonnier et al. | |
| 2002/0029214 A1 | 3/2002 | Yianilos et al. | |
| 2002/0099913 A1 | 7/2002 | Steely | |
| 2002/0165985 A1 | 11/2002 | Chen et al. | |
| 2002/0184643 A1 | 12/2002 | Fichet | |
| 2002/0199062 A1 | 12/2002 | Bormann | |
| 2003/0033026 A1 | 2/2003 | Murphy | |
| 2003/0033276 A1 | 2/2003 | Cheng et al. | |
| 2003/0061457 A1* | 3/2003 | Geiger et al. | 711/165 |
| 2003/0115417 A1 | 6/2003 | Corrigan | |
| 2003/0118023 A1 | 6/2003 | Brown et al. | |
| 2003/0123468 A1 | 7/2003 | Nong | |
| 2003/0200451 A1 | 10/2003 | Evans et al. | |
| 2004/0004964 A1 | 1/2004 | Lakshmanamurthy et al. | |
| 2004/0004968 A1 | 1/2004 | Nassar | |
| 2004/0057380 A1 | 3/2004 | Biran et al. | |
| 2004/0068616 A1 | 4/2004 | Tierney et al. | |
| 2004/0073623 A1* | 4/2004 | Benkual et al. | 709/213 |
| 2004/0255209 A1 | 12/2004 | Gross | |
| 2005/0010728 A1* | 1/2005 | Piry et al. | 711/147 |
| 2005/0021874 A1 | 1/2005 | Georgiou et al. | |
| 2005/0027920 A1 | 2/2005 | Fitzsimmons et al. | |
| 2005/0044323 A1 | 2/2005 | Hass | |
| 2005/0152352 A1 | 7/2005 | Jun et al. | |
| 2005/0160132 A1 | 7/2005 | Van Doren | |
| 2005/0216666 A1 | 9/2005 | Sih et al. | |
| 2005/0240820 A1 | 10/2005 | Vannerson et al. | |
| 2006/0095910 A1 | 5/2006 | Norton et al. | |
| 2006/0104281 A1 | 5/2006 | Scarr et al. | |
| 2006/0256783 A1 | 11/2006 | Ayrapetian et al. | |
| 2007/0005852 A1 | 1/2007 | Armstead et al. | |
| 2007/0016756 A1 | 1/2007 | Hsieh et al. | |
| 2007/0038798 A1 | 2/2007 | Bouchard et al. | |
| 2007/0083870 A1 | 4/2007 | Kanakogi | |
| 2007/0106990 A1 | 5/2007 | Kissell | |
| 2007/0226798 A1 | 9/2007 | Sibert | |
| 2007/0294702 A1 | 12/2007 | Melvin et al. | |
| 2008/0021908 A1 | 1/2008 | Trask et al. | |
| 2008/0046657 A1 | 2/2008 | Eichenberger et al. | |
| 2008/0077928 A1 | 3/2008 | Matsuzaki et al. | |
| 2008/0092092 A1 | 4/2008 | Dalton et al. | |
| 2008/0155002 A1 | 6/2008 | Janczak et al. | |
| 2008/0162793 A1 | 7/2008 | Chu et al. | |
| 2009/0006718 A1 | 1/2009 | Blumrich et al. | |
| 2009/0100055 A1 | 4/2009 | Wang | |
| 2009/0177830 A1 | 7/2009 | Orion et al. | |
| 2009/0216915 A1 | 8/2009 | Dunn et al. | |

(56) References Cited

U.S. PATENT DOCUMENTS

| | | | |
|---|---|---|---|
| 2009/0249318 A1 | 10/2009 | Ayguade et al. |
| 2009/0271562 A1 | 10/2009 | Sinclair |
| 2010/0100682 A1 | 4/2010 | Guthrie et al. |
| 2010/0110745 A1 | 5/2010 | Jeddeloh et al. |
| 2010/0238938 A1 | 9/2010 | Zhou et al. |
| 2010/0241813 A1 | 9/2010 | Shen |
| 2010/0257181 A1 | 10/2010 | Zhou et al. |
| 2010/0260198 A1 | 10/2010 | Rojas-Cessa et al. |
| 2010/0278195 A1 | 11/2010 | Wagh et al. |
| 2010/0293312 A1 | 11/2010 | Sonnier et al. |
| 2010/0293353 A1 | 11/2010 | Sonnier et al. |
| 2010/0332698 A1 | 12/2010 | Muller |
| 2011/0035555 A1 | 2/2011 | Wang et al. |
| 2011/0055439 A1 | 3/2011 | Chen et al. |
| 2011/0145501 A1 | 6/2011 | Steely et al. |
| 2011/0225334 A1 | 9/2011 | Byrne et al. |
| 2011/0225337 A1 | 9/2011 | Byrne et al. |
| 2011/0320728 A1 | 12/2011 | Dunn Berger et al. |
| 2012/0005391 A1 | 1/2012 | Byrne et al. |
| 2012/0036134 A1 | 2/2012 | Malakhov |

OTHER PUBLICATIONS

Kumar, S. et al., "Carbon: Architectural Support for Fine-Grained Parallelism on Chip Multiprocessors", ISCA '07, Jun. 9-13, 2007, pp. 162-173.
Final Office action from U.S. Appl. No. 12/782,379, mailed Feb. 21, 2013, 7 pages.
Office action from U.S. Appl. No. 12/782,379, mailed Nov. 17, 2014, 7 pages.
Notice of Allowance from U.S. Appl. No. 12/782,379, mailed Mar. 11, 2015, 9 pages.
Office action from U.S. Appl. No. 12/782,393, mailed Mar. 28, 2012, 16 pages.
Notice of Allowance from U.S. Appl. No. 12/782,393, mailed May 1, 2012, 10 pages.
Office action from U.S. Appl. No. 12/782,411, mailed Jul. 26, 2012, 14 pages.
Notice of Allowance from U.S. Appl. No. 12/782,411, mailed Nov. 28, 2012, 7 pages.
Office action from U.S. Appl. No. 12/430,438, mailed Dec. 12, 2011, 13 pages.
Final Office action from U.S. Appl. No. 12/430,438, mailed Mar. 23, 2012, 13 pages.
Notice of Allowance from U.S. Appl. No. 12/430,438, mailed Sep. 13, 2012, 5 pages.
Notice of Allowance from U.S. Appl. No. 12/729,226, mailed Apr. 13, 2012, 10 pages.
Supplemental Notice of Allowability from U.S. Appl. No. 12/729,226, mailed Jun. 8, 2012, 6 pages.
Supplemental Notice of Allowability from U.S. Appl. No. 12/729,226, mailed Jun. 21, 2012, 6 pages.
Notice of Allowance from U.S. Appl. No. 12/729,231, mailed Nov. 21, 2012, 11 pages.
Notice of Allowance from U.S. Appl. No. 12/963,895, mailed Apr. 1, 2013, 12 pages.
Office action from U.S. Appl. No. 12/971,742, mailed Feb. 20, 2013, 17 pages.
Final Office action from U.S. Appl. No. 12/971,742, mailed Sep. 11, 2013, 17 pages.
Notice of Allowance from U.S. Appl. No. 12/971,742, mailed Dec. 3, 2014, 7 pages.
Office action from U.S. Appl. No. 12/974,477, mailed Jan. 31, 2014, 19 pages.
Notice of Allowance from U.S. Appl. No. 12/974,477, mailed Oct. 22, 2014, 19 pages.
Office action from U.S. Appl. No. 12/975,823, mailed Dec. 18, 2012, 19 pages.
Notice of Allowance from U.S. Appl. No. 12/975,823, mailed Apr. 4, 2013, 16 pages.
Office action from U.S. Appl. No. 12/975,880, mailed Sep. 26, 2012, 18 pages.
Final Office action from U.S. Appl. No. 12/975,880, mailed Nov. 27, 2012, 24 pages.
Notice of Allowance from U.S. Appl. No. 12/975,880, mailed Apr. 19, 2013, 11 pages.
Office action from U.S. Appl. No. 12/976,045, mailed May 21, 2014, 10 pages.
Notice of Allowance from U.S. Appl. No. 12/976,045, mailed Jul. 3, 2014, 5 pages.
Notice of Allowance from U.S. Appl. No. 12/976,228, mailed Sep. 16, 2014, 8 pages.
Office action from U.S. Appl. No. 12/979,551, mailed Oct. 24, 2012, 10 pages.
Notice of Allowance from U.S. Appl. No. 12/979,551, mailed Mar. 15, 2013, 5 pages.
Notice of Allowance from U.S. Appl. No. 12/979,665, mailed Mar. 15, 2013, 7 pages.
Corrected Notice of Allowability from U.S. Appl. No. 12/979,665, mailed May 30, 2013, 4 pages.
ARM. AMBA AXI Protocol. V1.0. Specification. Mar. 19, 2004, 108 pages.
IBM. 128-Bit Processor Local Bus. Architecture Specifications. Version 4.7. May 2, 2007, 175 pages.
Office action from U.S. Appl. No. 12/979,800, mailed Mar. 20, 2013, 7 pages.
Xilinx. LogiCORE IP PLBV46 to AXI Bridge. Version 2.00a. Sep. 21, 2010, 37 pages.
Regula, Jack. Using Non-Transparent Bridging in PCI Express Systems. Jun. 1, 2004, 31 pages.
Notice of Allowance from U.S. Appl. No. 12/979,800, mailed May 6, 2013, 8 pages.
Office action from U.S. Appl. No. 13/046,717, mailed Mar. 27, 2013, 6 pages.
Notice of Allowance from U.S. Appl. No. 13/046,717, mailed May 16, 2013, 8 pages.
Office action from U.S. Appl. No. 13/046,917, mailed May 9, 2012, 18 pages.
Notice of Allowance from U.S. Appl. No. 13/046,719, mailed Aug. 1, 2012, 8 pages.
Office action from U.S. Appl. No. 13/046,726, mailed Nov. 2, 2012, 15 pages.
Final Office action from U.S. Appl. No. 13/046,726, mailed Mar. 19, 2013, 18 pages.
Notice of Allowance from U.S. Appl. No. 13/046,726, mailed May 13, 2013, 10 pages.
Office action from U.S. Appl. No. 13/192,104, mailed Jun. 16, 2014, 24 pages.
Final Office action from U.S. Appl. No. 13/192,104, mailed Sep. 29, 2014, 25 pages.
Office action from U.S. Appl. No. 13/192,104, mailed Jan. 29, 2015, 26 pages.
Notice of Allowance from U.S. Appl. No. 13/192,104, mailed Jul. 8, 2015, 7 pages.
Office action from U.S. Appl. No. 13/192,187, mailed Jun. 3, 2014, 20 pages.
Office action from U.S. Appl. No. 13/192,187, mailed Sep. 23, 2014, 21 pages.
Final Office action from U.S. Appl. No. 13/192,187, mailed Jan. 28, 2015, 23 pages.

\* cited by examiner

504

506

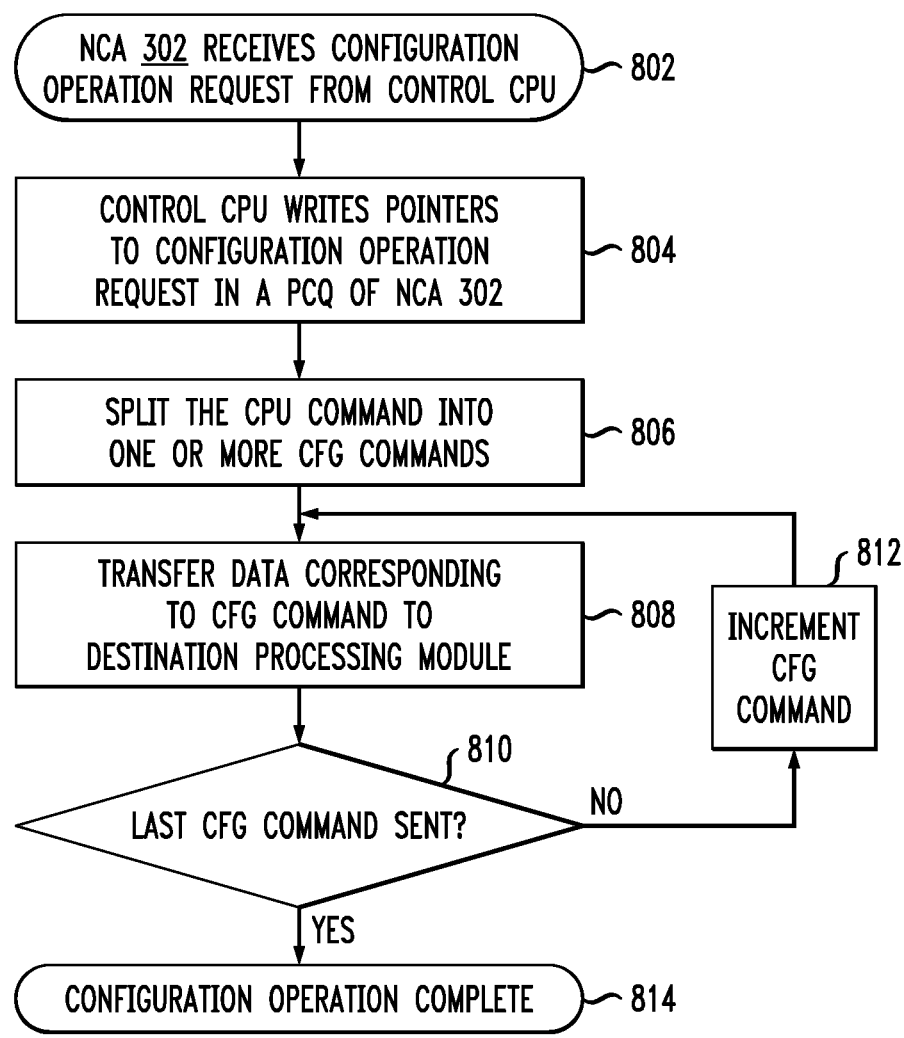

DYNAMIC CONFIGURATION OF PROCESSING MODULES IN A NETWORK COMMUNICATIONS PROCESSOR ARCHITECTURE

CROSS-REFERENCE TO RELATED APPLICATIONS

This application claims the benefit of the filing date of U.S. provisional application Nos. 61/421,243, filed Dec. 9, 2010 and 61/426,857, filed Dec. 23, 2010, the teachings of which are incorporated herein in their entireties by reference.

This application is a continuation-in-part, and claims the benefit of the filing date, of U.S. patent application Ser. No. 12/782,379 filed May 18, 2010 now U.S. Pat. No. 9,081,742, Ser. No. 12/782,393 filed May 18, 2010 now U.S. Pat. No. 8,255,644, and Ser. No. 12/782,411 filed May 18, 2010 now U.S. Pat. No. 8,407,707, the teachings of which are incorporated herein in their entireties by reference.

The subject matter of this application is related to U.S. patent application Ser. No. 12/430,438 filed Apr. 27, 2009, Ser. No. 12/729,226 filed Mar. 22, 2010, Ser. No. 12/729,231 filed Mar. 22, 2010, Ser. No. 12/963,895 filed Dec. 9, 2010, Ser. No. 12/971,742 filed Dec. 17, 2010, Ser. No. 12/974,477 filed Dec. 21, 2010, Ser. No. 12/975,823 filed Dec. 22, 2010, Ser. No. 12/975,880 filed Dec. 22, 2010, Ser. No. 12/976,045 filed Dec. 22, 2010, Ser. No. 12/976,228 filed Dec. 22, 2010, Ser. No. 12/979,551 filed Dec. 28, 2010, Ser. No. 12/979,665 filed Dec. 28, 2010, Ser. No. 12/979,800 filed Dec. 28, 2010, Ser. No. 13/046,717 filed Mar. 12, 2011, Ser. No. 13/046,719 filed Mar. 12, 2011, Ser. No. 13/046,726 filed Mar. 12, 2011, Ser. No. 13/192,104 filed on common date herewith, and Ser. No. 13/192,187 filed on common date herewith, the teachings of which are incorporated herein in their entireties by reference.

BACKGROUND OF THE INVENTION

1. Field of the Invention

The present invention relates to processor architectures, in particular, to configuring processing modules in a multi-processor application specific integrated circuit.

2. Description of the Related Art

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors diminished performance improvements, or actually slowed down overall network processor throughput. Newer designs add hardware accelerators to offload certain tasks from the general-purpose processors, such as encryption/decryption, packet data inspections, and the like. These newer network processor designs are traditionally implemented with either i) a non-pipelined architecture or ii) a fixed-pipeline architecture.

In a typical non-pipelined architecture, general-purpose processors are responsible for each action taken by acceleration functions. A non-pipelined architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline architecture, packet data flows through the general-purpose processors and/or accelerators in a fixed sequence regardless of whether a particular processor or accelerator is required to process a given packet. This fixed sequence might add significant overhead to packet processing and has limited flexibility to handle new protocols, limiting the advantage provided by using the accelerators.

Network processors implemented as a system on chip (SoC) having multiple processing modules might typically employ sophisticated techniques to configure the various processing modules, for example, such as employing a coherent communications bus, such as Processor Local Bus (PLB), which is a microprocessor bus architecture introduced by IBM, or Advanced eXtensible Interface (AXI), which is a higher frequency implementation of the Advanced Microcontroller Bus Architecture (AMBA) introduced by ARM Ltd.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a method of updating configuration data of a network processor having one or more processing modules and a shared memory. A control processor of the network processor writes updated configuration data to the shared memory and sends a configuration update request to a configuration manager. The configuration update request corresponds to the updated configuration data. The configuration manager determines whether the configuration update request corresponds to settings of a given one of the processing modules. If the configuration update request corresponds to settings of a given one of the one or more processing modules, the configuration manager sends one or more configuration operations to a destination one of the processing modules corresponding to the configuration update request and updated configuration data. The destination processing module updates one or more register values corresponding to configuration settings of the processing module with the corresponding updated configuration data. Otherwise, if the configuration update request corresponds to configuration data stored in the at least one shared memory, the configuration manager sends one or more configuration operations to a destination one of the one or more processing modules, and the configuration manager performs a coherent memory update operation corresponding to the configuration data stored in the at least one shared memory.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 8 shows a flow diagram of a configuration command parsing process employing the network processor CPU adapter of FIG. 3.

DETAILED DESCRIPTION

Described embodiments of the present invention provide for updating configuration settings of one or more processing modules of a multi-processor SoC. One or more configuration ring communications buses are in communication with configurable processing modules of the SoC. A configuration controller is in communication with the configuration ring buses and one or more memories of the SoC. Described embodiments implement a set of commands to configure processing modules of the SoC through multiple datapaths, for example, the configuration ring buses, the system memory, a debugging interface or internal or external processors. The configuration command set might also ensure memory coherency between different memories within the SoC architecture.

Table 1 defines a list of acronyms employed throughout this specification as an aid to understanding the described embodiments of the present invention:

TABLE 1

| USB | Universal Serial Bus | FIFO | First-In, First-Out |
|---|---|---|---|
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | MMB | Memory Manager Block |
| SRIO | Serial RapidIO | CPU | Central Processing Unit |
| SoC | System-on-Chip | µP | Microprocessor |
| AXI | Advanced eXtensible Interface | PLB | Processor Local Bus |
| AMBA | Advanced Microcontroller Bus Architecture | MPP | Modular Packet Processor |
| PAB | Packet Assembly Block | AAL5 | ATM Adaptation Layer 5 |
| MTM | Modular Traffic Manager | SED | Stream Editor |
| DBC | Data Buffer Controller | THID | Thread Identifier |
| HE | Hash Engine | PQM | Pre-Queue Modifier |
| SENG | State Engine | FBI | Function Bus Interface |
| TID | Task Identifier | CCL | Classification Completion List |
| SCH | Scheduler | SEM | Semaphore Engine |
| SPP | Security Protocol Processor | PCM | Per Context Memory |
| TIL | Task Input Logic | PDU | Protocol Data Unit |
| TCP | Transmission Control Protocol | PIC | Packet Integrity Checker |
| PCQ | Producer-Consumer Queue | JTAG | Joint Test Action Group |
| IP | Internet Protocol | CRC | Cyclic Redundancy Check |

Figure 1:
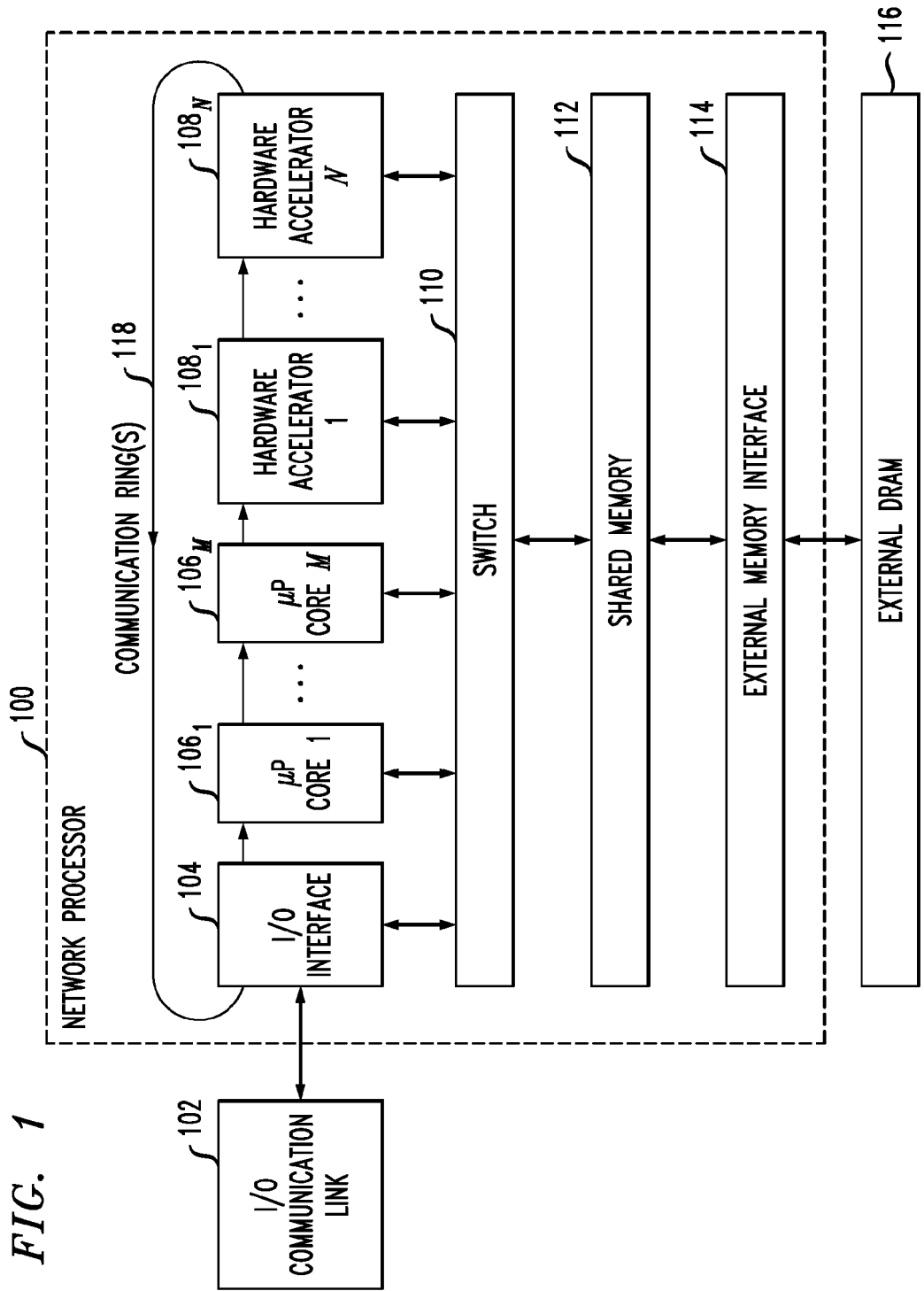
FIG. 1 shows a block diagram of a network processor operating in accordance with exemplary embodiments of the present invention.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (µP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, µP cores and hardware accelerators might be coupled through switch 110 to shared memory 112. Switch 110 might be implemented as a non-blocking crossbar switch such as described in related U.S. patent applications Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various µP cores 106 and hardware accelerators 108. External memory interface 114 couples shared memory 112 to one or more external memories, shown as external memory 116, to provide off-chip storage of data not needed by the various µP cores 106 and hardware accelerators 108 to free space in shared memory 112. The µP cores and hardware accelerators might interact with each other, for example, by one or more communication bus rings 118 that pass "tasks" from a source core to a destination core. As described herein, tasks are instructions to the destination core to perform certain functions, and a task might contain address pointers to data stored in shared memory 112, as described in related U.S. patent applications Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112. I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted externally of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various µP cores 106 and hardware accelerators 108 of network processor 100 might include several exemplary types of processors or accelerators. For example, the various µP cores 106 might be implemented as Pentium® or Power PC® processors, or a combination of different processor types (Pentium® is a registered trademark of Intel Corporation, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more different virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. No. 7,439,652 or U.S. Patent Application Publication No. 2008/0270342, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache trashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010, which is incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, which is incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010, which are incorporated by reference herein. The MPP might also include hash functionality such as described in related U.S.

patent application Ser. Nos. 13/046,717, 13/046,719, and 13/046,726 all filed Mar. 12, 2011, which are incorporated by reference herein.

Figure 2:
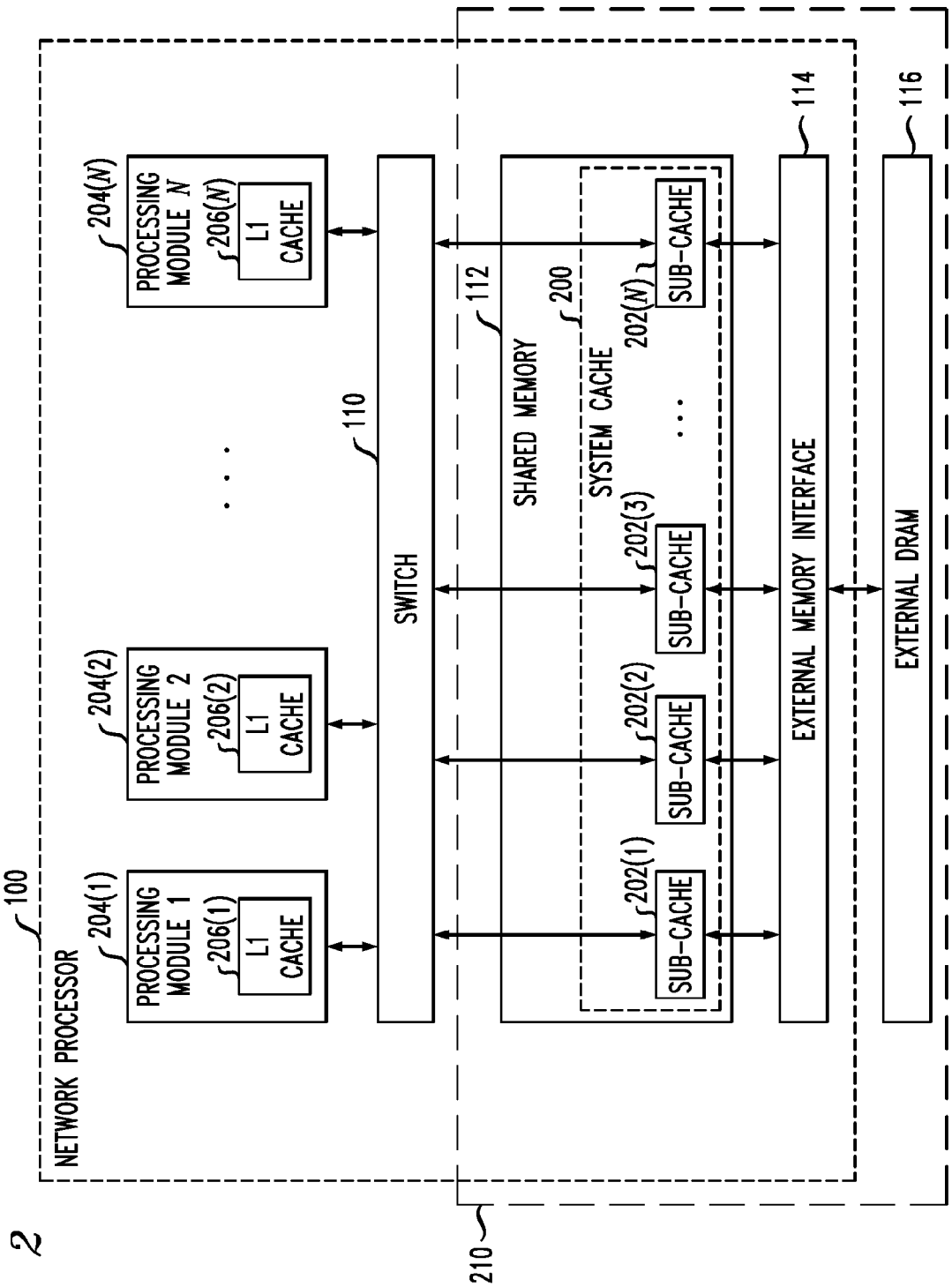
FIG. 2 shows a block diagram of a system cache of the network processor of FIG. 1.

FIG. 2 shows a block diagram of an exemplary embodiment of system cache 200 of network processor 100, in accordance with embodiments of the present invention. As shown in FIG. 2, system cache 200 might be implemented in shared memory 112. System cache 200 might include one or more sub-caches, shown as sub-caches 202(1)-202(N). Sub-caches 202(1)-202(N) might be employed to cache data from any µP core or accelerator (e.g., µP cores 106 or accelerators 108) of network processor 100. As indicated by dashed line 210, shared memory 112 and external memory 116 might generally be referred to as system memory 212.

As described in related U.S. patent applications Ser. Nos. 12/782,379, 12/782,393, and 12/782,411, which are incorporated by reference herein, sub-caches 202(1)-202(N) might be addressed via switch 110 in such a way as to balance access to the caches, referred to herein as striping, helping to avoid hot spots in shared memory 112, improve performance of the caching in and out of external memory 116, and reduce cache access bottlenecks. Thus, in embodiments of the present invention, each sub-cache 202(1)-202(N) might form a memory array, and the number of system caches might preferably be implemented as a power of two. One or more memory blocks might be allocated to each sub-cache 202(1)-202(N). In embodiments of the present invention, each sub-cache 202(1)-202(N) might be implemented as an N-way associative cache employing a least recently used (LRU) caching algorithm. In some embodiments, each sub-cache 202(1)-202(N) might have a total size of 512 kB and a cache line length of 256 B.

As shown in FIG. 2, one or more of processing modules 204(1)-204(N) might have a corresponding local level one (L1) cache, shown as L1 caches 206(1)-206(N). The function of L1 caches 206(1)-206(N) is to act as an interface to system cache 200 for client processing modules 204(1)-204(N) of network processor 100. L1 caches 206(1)-206(N) might be referred to as "pipeline" caches, since L1 caches 206(1)-206(N) might typically be employed only for certain ones of client processing modules 204(1)-204(N) that access system cache 200 as part of an execution pipeline.

Figure 3:
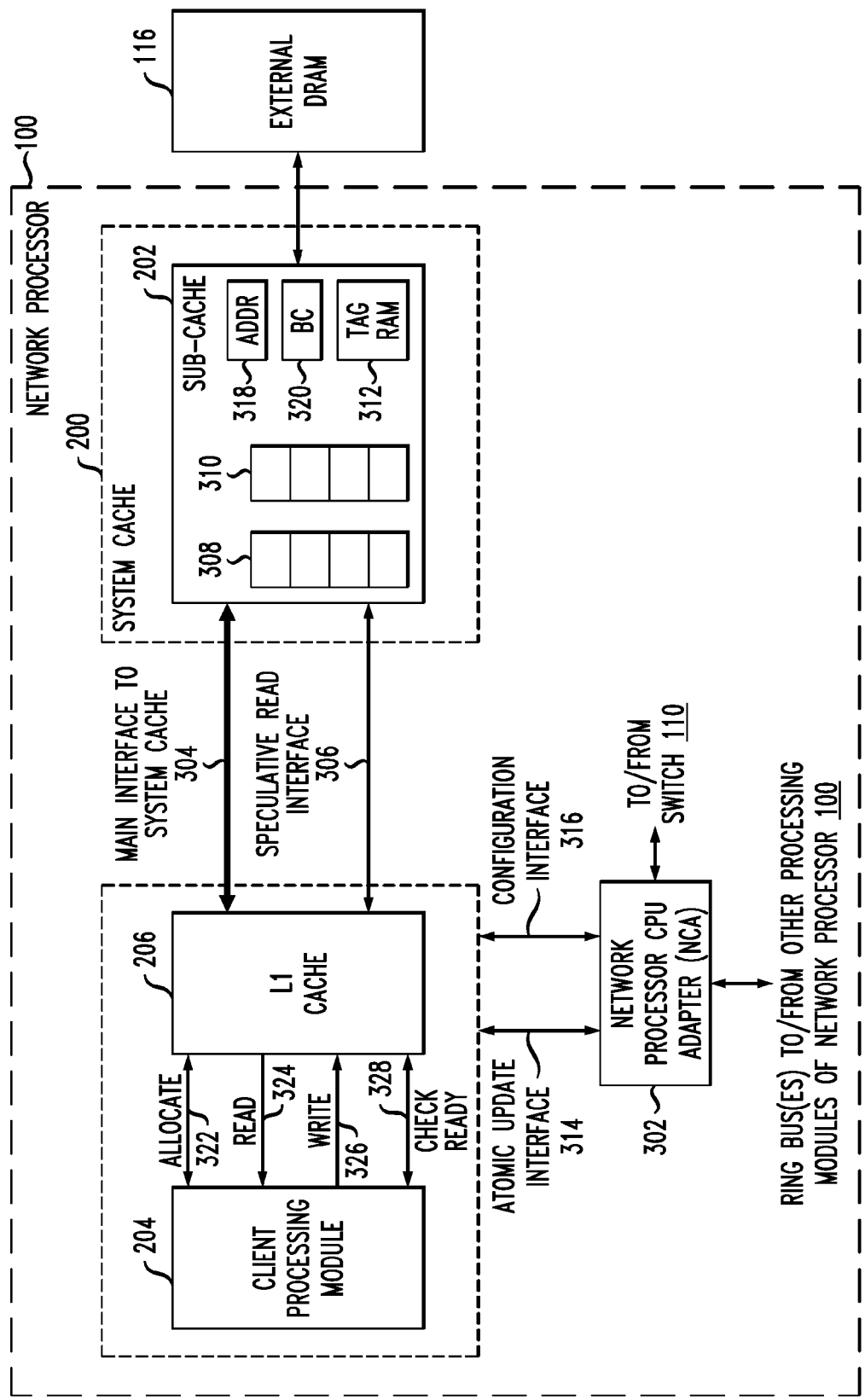
FIG. 3 shows a block diagram of an interface between a processing module, a level-one (L1) cache, and the system cache of the network processor of FIG. 1.

As shown in FIG. 3, network processor 100 might include network processor CPU adapter (NCA) 302. As shown, NCA 302 is in communication with one or more of the ring communication buses of network processor 100 to communicate with the various µP cores 106 and hardware accelerators 108. NCA 302 is also in communication with switch 110. As described herein, the various µP cores 106 might typically communicate between each other using a coherent communications bus, such as Processor Local Bus (PLB), which is a microprocessor bus architecture introduced by IBM, or Advanced eXtensible Interface (AXI), which is a higher frequency implementation of the Advanced Microcontroller Bus Architecture (AMBA) introduced by ARM Ltd.

System cache 200 might not typically maintain task data coherency with one or more local caches of the various hardware accelerators 108, since hardware accelerators 108 might not generally communicate with each other over a coherent bus. NCA 302 might be employed to provide task data to a given one of accelerators 108 such that the task data in a local cache of one of accelerators 108 is coherent with the local CPU caches of µP cores 106 and system cache 200.

For example, the local caches of the various µP cores 106 might be coherent with each other by using a coherent communication bus architecture, such as PLB, to perform memory operations to request data for their corresponding L1 caches. NCA 302 might copy task data from system memory 112 through its interface to switch 110 to copy task data from system memory 112 to the CPU cache via the PLB bus. To copy data from system memory 112 to a CPU cache over the PLB bus, NCA 302 might include one or more communications bus bridges to communicate between two or more bus architectures, for example, as described in related U.S. patent application Ser. Nos. 12/979,551, 12/979,665 and 12/979,800 all filed Dec. 28, 2010, incorporated by reference herein.

As described herein, by employing a coherent communications bus, such as PLB, data coherency between the local caches of the various µP cores 106 is maintained. NCA 302 might also provide for communications between the various hardware accelerators 108 and the various µP cores 106. NCA 302 might further allow for communications buses internal to network processor 100 to be in communication with a processor external to network processor 100 via, for example, a PCI-E or SRIO communication bus architecture. Thus, NCA 302 might allow a processor external to network processor 100 to access data stored in system memory 112, which is internal to network processor 100, and also access data in external memory 116 without the external processor being directly connected to external memory 116.

In accordance with described embodiments, the various hardware accelerators 108 or other processing modules of network processor 100 might not typically employ a complex coherent communications bus architecture. To provide data coherency between the local L1 caches 206 of processing modules that do not employ a coherent bus, NCA 302 might provide for atomic updates to system cache 200 to update data from one of L1 caches 206. An atomic update is an update that prevents any client processing module from accessing a cache line being written by the atomic update. Thus, the client processing module is prevented from retrieving out-of-date data from L1 cache 206. NCA 302 might operate to maintain data coherency of data stored in L1 caches of hardware accelerators 108.

NCA 302 might perform coherent updates of each sub-cache 202(1)-202(N). For example, NCA 302 sends a signal to the corresponding client processing module indicating that the coherent write operation is complete. In embodiments of the present invention, NCA 302 transmits the coherent write complete signal via a configuration ring bus between the client processing modules 204. As described in related U.S. patent application Ser. No. 12/782,379, a ring bus of network processor 100 might be a unidirectional bus that passes signals from a source processing module, to a next processing module on the ring bus, with the signals passed module-to-module until a corresponding destination processing module receives the signal. As described herein, a configuration ring bus of network processor 100 might be employed to pass small configuration messages, such as the atomic write complete signal, between NCA 302 and client processing modules 204.

Figure 4:
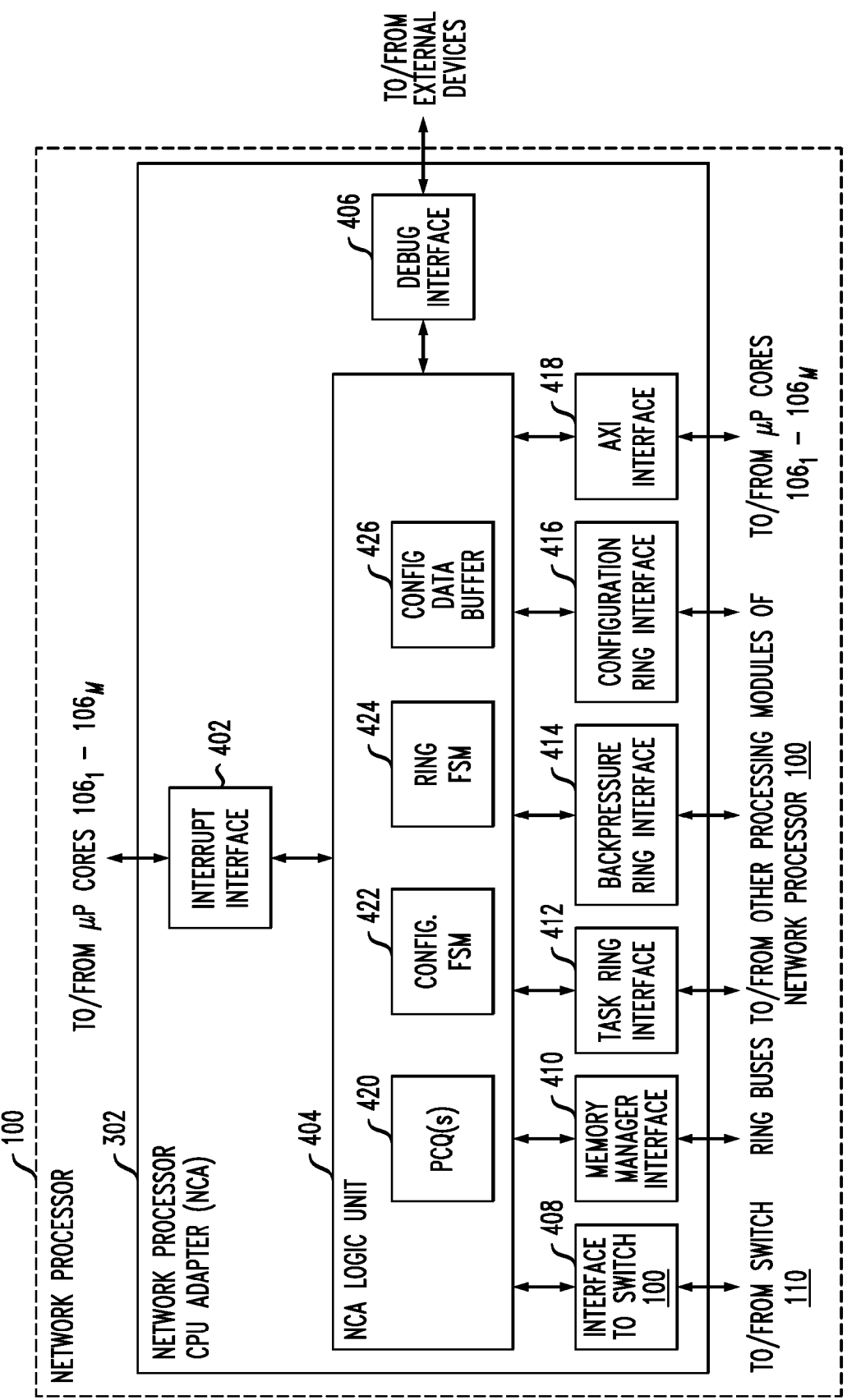
FIG. 4 shows a block diagram of the network processor CPU adapter of FIG. 3.

FIG. 4 shows additional detail of NCA 302. As shown in FIG. 4, NCA 302 includes NCA logic unit 404. NCA logic unit 404 is in communication with one or more interfaces to external modules of network processor 100 via corresponding interfaces shown as interrupt interface 402, debug interface 406, switch 110 interface 408, memory manager interface 410, task ring interface 412, backpressure ring interface 414, configuration ring 416 and Advanced eXtensible Interface (AXI) interface 418. Switch 110 interface 408 might be employed to allow NCA 302 to access shared memory 112 and external memory 116. Memory manager interface 410 might be employed to request one or more memory blocks to be allocated by the MMB for use by NCA 302. Task ring interface 412 might enable NCA 302 to send and receive tasks between one or more processing modules of network processor 100 such as described in related U.S. patent application Ser. No. 12/782,379. If NCA 302 receives too more than a threshold number of tasks, NCA 302 might send a backpressure signal on a backpressure ring of network processor 100 via backpressure ring interface 414 such as described in related U.S. patent application Ser. No. 12/782, 379. Configuration ring interface 416 might be employed to send configuration signals from NCA 302 to one or more processing modules of network processor 100, as described herein.

Interrupt interface 402 might allow NCA logic unit 404 to send an interrupt signal to one or more of the various μP cores 106. Through debug interface 406, registers of NCA 302 might be accessed by devices external to network processor 100 via, for example, a Joint Test Action Group (JTAG) interface, a Serial Wire Debug (SWD) interface, a Serial Peripheral Interface (SPI), a Universal Asynchronous Receiver/Transmitter (UART), or another debugging interface protocol. In some embodiments, debug interface 406 might enable a debugging device external to network processor 100 to initiate a configuration command from NCA 302 on the configuration communication ring via configuration ring interface 416.

AXI interface 418 might include an AXI Master interface and an AXI Slave interface to an AXI communications bus of network processor 100. Network processor 100 might employ the AXI communications bus to provide communications between the various μP cores 106 or other processing modules that support the AXI protocol. For example, the AXI Master interface might be employed by NCA 302 to access coherent system memory space in system memory 110, as well as local L1 cache memory 206 of the corresponding μP core 106. The AXI Slave interface might allow the various μP cores 106 to access one or more internal registers of NCA 302.

In some embodiments, network processor 100 might include one or more protocol bridges, for example to translate AXI communications to another communication protocol, such as Processor Local Bus (PLB). Such a protocol bridge is described in related U.S. patent application Ser. Nos. 12/979,800, 12/979,665 and 12/979,551, which are incorporated herein by reference in their entireties. Thus, the architectural design of network processor 100 might be "agnostic" to the chosen processor architecture for the various μP cores 106 or any external processors in communication with network processor 100.

Communication between the various μP cores 106 and NCA 302 might be based on one or more Producer-Consumer Queues (PCQs) 420 of NCA logic unit 404. A PCQ might be implemented as a circular queue having a producer queue index and a consumer queue index. The producer queue index (P) might typically point to the first available entry of the PCQ. The producer, for example one of the various μP cores 106, adds to the queue by writing to the next entry of the PCQ pointed to by P, and then incrementing P to point to the next available entry. The consumer queue index (C) might typically point to the first entry of the PCQ. When C equals P, the PCQ is empty. When C is not equal to P, one or more entries are pending in the PCQ. The consumer processes the queue entry pointed to by C and then increments C until C is equal to P. Since the PCQ is circular, when either C or P points to the last entry of the queue, the next increment of C or P sets the pointer to the first queue entry. When an increment of P would result in P equaling C, the PCQ is full to avoid the queue improperly being considered empty. Thus, given a queue size of N, up to N-1 queue entries can be used before the queue becomes full.

NCA logic unit 404 might include one or more PCQs, for example an input task PCQ, an output task PCQ and a configuration message PCQ. Task ring interface 412 receives input tasks from a task ring interface of network processor 100. When an input task is received by task ring interface 412, a task identifier (TID) is assigned to the task, and task header and task parameter information is stored in an input task queue (iPCQ). NCA logic unit 404 might then form AXI operations based on the input task, and provide the AXI operations to AXI interface 418. An AXI memory address might be associated with the entry in the iPCQ. The producer index of the iPCQ is incremented. NCA logic unit 404 might perform tasks for a given flow in the order in which tasks are received in the corresponding iPCQ. For example, at least one iPCQ might be used to store ordered tasks, while another iPCQ might be used to store non-ordered tasks.

As described, NCA logic unit 404 might include one or more output queues (oPCQs). Output of the one or more oPCQs might be arbitrated, for example in a round robin fashion, to determine which oPCQ is able to output a task to AXI interface 418. A task in an oPCQ might correspond to a request for data from a device in communication with NCA 302 via an AXI bus of network processor 100. Each oPCQ entry might include a task header, task parameters, and an index to corresponding task data. NCA logic unit 404 sends an AXI read request corresponding to the oPCQ entry to AXI interface 418. Data returned to AXI interface 418 might be stored in an iPCQ and reassembled into corresponding tasks by NCA logic unit 404.

Configuration ring interface 416 allows NCA 302 to configure one or more processing modules of network processor 100. Two types of configuration operations might be performed by NCA 302: Programmed I/O (PIO) operations and Producer-Consumer Queue (PCQ) operations. Configuration ring interface 416 might receive configuration requests from one of μP cores 106 or a processor external to network processor 100, and NCA logic unit 404 might include one or more configuration queues (PCQs 420) to queue received configuration requests. In response to a configuration request, NCA 302 might generate one or more AXI operations, for example, to transfer data between one of μP cores 106 and accelerators 108. NCA 302 might also transfer data from system memory 112 or external memory 116. NCA logic unit 404 might control the configuration process.

The configuration communication ring of network processor 100 might connect any processing modules of network processor 100 that might be later configured by an internal or external microprocessor, for example, the configuration ring might connect to various ones of accelerators 108. NCA 302 might send a configuration command via the configuration ring to one or more processing modules connected to the configuration ring. A command issued on the configuration ring is complete when either: i) NCA 302 receives an acknowledgement signal from the target processing module(s) for the corresponding configuration command, or ii) if the configuration command traverses the entire communication ring and returns to NCA 302 without reaching a target processing module. In general, a read configuration command might be acknowledged by returning the requested data and a write configuration command might be acknowledged by sending an acknowledge signal on the configuration ring to NCA 302 when the data is written. If a configuration command is broadcast to more than one target processing module, each target processing module acknowledges the configuration command.

In some embodiments, the configuration ring of network processor 100 might be implemented as having a 3-bit command field, a 32-bit data field and 1-bit for error detection. The configuration command field might define the type of data in the data field.

As described herein, embodiments of the present invention provide for updating configuration settings of one or more processing modules of a multi-processor SoC such as network processor 100. One or more configuration ring communications buses are in communication with configurable processing modules of network processor 100, such as accelerators 108. A configuration controller, such as NCA 302, is in communication with the configuration ring buses and one or more memories of network processor 100, such as system memory 112, external memory 116 and local L1 caches 206 of one or more corresponding µP cores 106. Described embodiments implement a set of commands to configure processing modules of network processor 100 through multiple datapaths, for example, the configuration ring buses, the system memory, a debugging interface or internal or external processors. The configuration command set might also ensure memory coherency between different memories within network processor 100.

As described herein, NCA 302 might provide an interface for internal processors 106 or an external processor to dynamically reconfigure one or more of accelerators 108 during operation of network processor 100. NCA 302 might coordinate configuration requests from the one or more processors and might operate in a direct memory access (DMA) mode where producer-consumer queues (PCQs) are employed to provide configuration commands and data from the processors to the accelerators. As shown in FIG. 4, NCA 302 might be in communication with multiple buses of network processor 100, such as i) an AXI bus for communication to one or more microprocessors, such as µP cores 106 or processors external to network processor 100, ii) switch 110 for access to system memory 112 and external memory 116, and iii) one or more ring buses for communication to one or more of accelerators 108.

As described herein, NCA 302 might generally function as a "configuration master" to update settings between one or more processors connected to an AXI bus. Each processor might typically have L1 and L2 caches, such as L1 cache 206, in communication with the processor via the AXI bus or some other CPU-level bus. System memory 112 or a L3 system cache, such as system cache 200, might be in communication with NCA 302 via switch 110.

As a configuration master, NCA 302 might perform configuration requests from one of µP cores 106 or processors external to network processor 100 to update settings of one or more processing modules of network processor 100. To perform the configuration requests, NCA 302 might create one or more AXI operations based on a given configuration request. For example, configuration data might be stored in system memory 112. NCA 302 might receive a configuration request via the AXI bus and generate one or more corresponding configuration operations on the configuration ring bus or to transfer data between system memory 112 and a corresponding L1 cache 206 or to transfer the data via the configuration ring bus.

NCA logic unit 404 might provide multiple parallel data flows. For example, NCA logic unit 404 might be implemented to provide parallel processing of operations for the one or more configuration ring bus (via configuration ring interface 416) and of operations for one or more processors (via AXI interface 418). Parallel processing of processor operations and configuration operations might be handled by two or more finite state machines (FSMs) of NCA logic unit 404. For example, a first FSM, shown as Config FSM 422 might be implemented to process configuration operations, and a second FSM, shown as Ring FSM 424, might be implemented to process physical layer operations for the configuration ring bus. For example, Config FSM 422 might perform accesses to system memory 112. Ring FSM 424 might perform operations such as grouping or partitioning data into one or more command messages to be sent on the one or more communication ring buses and tracking completion of the commands by the various processing modules in communication with the ring buses. Configuration operations requiring coherent data operations between an L1 cache 206 and system memory 112 might be performed by a combination of both FSMs in which the FSMs might hand over execution of a given configuration operation between each other.

Config data buffer 426 might be employed to buffer data being transferred between switch 110 interface 408 and AXI interface 418. In some embodiments, config data buffer 426 might be implemented as a ping-pong buffer in a dual-port RAM. Configuration data might be written from one of interfaces 408 and 418 and read out by the other interface. In some embodiments, config data buffer 426 has two 64 word partitions, where each word is 128 bits. One port might be dedicated for read operations, while a second port of the dual-port RAM might be dedicated for write operations.

In some described embodiments, data transferred via AXI interface 418 might be 32 bits wide, whereas data transferred via switch 110 interface 408 might be 128 bits wide. Ring FSM 424 might employ config data buffer 426 and PCQs 420 to combine smaller AXI data packets into a larger data packet for transfer via switch 110. Similarly, ring FSM 424 might employ config data buffer 426 and PCQs 420 to split a larger data packet from switch 110 into one or more smaller AXI data packets for transfer via interface 418.

As described herein, NCA 302 might function as a configuration master control to source configuration commands to one or more modules in communication with NCA 302 by way of at least one configuration ring bus of network processor 100. A configuration ring bus of network processor 100 might be implemented as a bus having a 3-bit command field, a 32-bit data field and 1-bit for error detection for a total of 36 bits. Each command might include a Node_ID field to identify one or more target modules on the configuration ring bus intended to receive the configuration command Configuration Ring Interface 416 generates ring bus commands for commands from one of the other interfaces, and receives corresponding responses on the ring bus. The data field might include both the header and payload data blocks, where a block is the 32-bits of data transferred by the data field in one clock cycle. The type of data in the data field is defined by value of the command field.

The CFG ring might support only one outstanding command on the ring at any one time such that a command issued by NCA 302 is complete before another command is issued. A command is complete when (i) NCA 302 receives an acknowledgement in response to an issued command, or (ii) the command has been forwarded from node to node on the CFG ring and has arrived back at NCA 302 without reaching a destination processing module.

In some embodiments, NCA 302 might support 3 types of acknowledgement commands: (i) Acknowledge (ACK), (ii) Target_Error, and (iii) Node_Error. Acknowledge (ACK) signals are generated by a client processing module in response to a command from NCA 302. The Target_Error command is generated when one of client processing modules 204 detect an address decode error or timeout error for an operation received from NCA 302 via the CFG ring. The Node_Error command is generated if NCA 302 detects a protocol error on the CFG ring.

For an ACK signal, the data field of the CFG ring contains the value of the response for the associated command. In general, read operations are acknowledged by returning the requested data via the ACK command on the CFG ring, and write operations send an ACK signal on the CFG ring when the write operation is complete. For example, for a read operation, there is one corresponding ACK signal for each memory address that is read and the data field contains the read data. For write operations, there is one ACK signal generated when all write operations have completed, and the data field of the CFG ring might provide the original header data for the write command. Status operations might return an ACK signal with the data field of the CFG ring containing a status value. Each ACK signal might also indicate an ID of which client processing module generated the ACK signal. In case of broadcast commands, each processing module receiving a broadcast command sends an ACK signal. NCA 302 waits for the corresponding ACK signals for a command before issuing another command on the CFG ring. Alternatively, if the command is passed by every processing module on the CFG ring and returns around the ring to NCA 302, the command is considered complete.

A Start command in the command field of the CFG ring might be issued to indicate the start of a valid CFG ring operation, where the data field includes header data and one or more instructions. A Node ID in the header data indicates which ones of processing modules 204 are the intended recipients of the command. As the command is passed along the CFG ring, if the Node ID in the header data does not match the Node ID of the processing module, the processing module then forwards the command to a next processing module on the CFG ring bus. If the Node ID in the header data matches the Node ID of the processing module, the processing module removes the command from the CFG ring and processes the command. The type of instruction in the header data might indicate a number of additional commands that will be received on the CFG ring for the given operation. If the command produces a result, an ACK signal or Target_Error signal is forwarded on the CFG ring.

In case of broadcast commands to multiple processing modules on the CFG ring, each processing module having a Node ID in a range of Node ID's indicated in the command header will receive the command from the CFG ring, and will also forward the command to the next node on the CFG ring. An ACK signal might be returned from each processing module receiving the broadcast command. A status command might be sent by NCA 302 as a debugging or development command to request an ACK signal from one or more client processing modules on the CFG ring, with the ACK signal including a status of the client processing module.

A Reset command might be issued by NCA 302 to reset client processing modules coupled to the CFG ring. In response to the reset command, the client processing modules might reset their internal state registers, buffers and state machines to an initial state. A reset command is passed along the CFG ring from client processing module to client processing module until the reset command arrives back at NCA 302 on the CFG ring. Each client processing module might take 2 clock cycles to process a reset, so the reset command might take 2*N clock cycles to propagate around the CFG ring, where N is the number of client processing modules coupled to the CFG ring.

As described herein, NCA 302 is coupled to one or more processor buses of network processor 100. For example, NCA 302 might be in communication with one or more coherent communications buses, such as an AXI bus via AXI interface 418. The various µP cores 106 might typically include L1 and L2 level caches coupled to their coherent processor buses, such as an AXI bus, while system cache 200 might not be coupled to the coherent processor bus, and local L1 caches of various of the hardware accelerators 108 are not coupled to a coherent processor bus. NCA 302 might provide coherent memory operations such that data of a local L1 cache of a given one of accelerators 108 is coherent with both the local CPU caches of µP cores 106 and system cache 200.

Further, NCA 302 might implement a Coherent System Memory Block Read (CSMBR) command to read one or more contiguous bytes of system cache 200 coherently with respect to an accelerator 108 that might have a local copy of the data in its L1 cache. In such as case, the accelerator's local L1 cache might contain the most recent updates for some portion of the data, and reading from system cache 200 might return out-of-date data since accelerators 108 are not on a coherent bus. The CSMBR command provides the ability to perform coherent system memory reads by the following two steps: (1) Write-back Engine Cache—In this step, NCA 302 issues a write request to write-back any updated data from the accelerator's local L1 cache to system cache 200; and (2) Read System Memory—Once any updated data is written from the accelerator's local L1 cache, NCA 302 issues a SMBR to system cache 200.

NCA 302 might also implement a Coherent System Memory Block Write (CSMBW) command to write one or more contiguous bytes of system memory coherently with respect to any accelerator 108 that might have a local copy of data stored in the corresponding line of system cache 200. For normal system cache write operations, coherency between system cache 200 and the various L1 caches 206 might not be maintained. However, in some instances control software running on one of µP cores 106 might need to update system data in system cache 200 that is also stored in one or more of L1 caches 206. For example, one of accelerators 108 might keep a local copy of data in its L1 cache 206, with the same data also stored in system cache 200. The data stored in system cache 200 might be writable by both the accelerator 108 and one or more of µP cores 106. The µP core 106 might need a way to coherently update the data in system cache 200 such that: (1) accelerator 108 receives the updated data and does not continue to use out-of-date data from its L1 cache 206, and (2) write operations from µP core 106 and accelerator 108 that occur nearly simultaneously do not corrupt each other.

The CSMBW command provides the ability to perform coherent system memory reads by the following three steps: (1) Start Coherent System Cache Update—In this step, NCA 302 issues an atomic write request to system cache 200 in order to update one or more contiguous memory blocks; (2) Issue Cache Update Command—In this step, NCA 302 issues a write request to reload the associated data to the accelerator's local L1 cache 206; (3) Finalize Coherent System Cache Update—In this step, NCA 302 issues an atomic read request to system cache 200. The atomic read is used to signal system cache 200 that the coherent update operation is complete.

Coherent operations and atomic read and write operations might be implemented substantially as described in related U.S. patent application Ser. Nos. 13/192,104 filed on common date herewith, and Ser. No. 13/192,187 filed on common date herewith, incorporated herein by reference. For example, the various hardware accelerators 108 or other processing modules of network processor 100 might not typically employ a complex coherent communications bus architecture. To provide data coherency between the L1 pipeline caches 208 and system cache 200, NCA 302 might provide for coherent update operations between system cache 200 and L1 pipeline caches 208. For example, a coherent write operation might update data in system cache 200 with changed data in one of the L1 pipeline caches 208. A coherent read operation might update data in one of L1 pipeline caches 208 with data from system cache 200. An coherent update is an update that prevents any client processing module from overwriting updated data in a cache line being written by the coherent update.

Typically, coherent operations might occur a) when control software running on one of µP cores 106 requires current data from one of L1 pipeline caches 208 (a coherent write operation to system cache 200) or b) when control software running on one of µP cores 106 updates control data in system cache 200 and wants to ensure that the updated control data is also updated in L1 pipeline caches 208 (a coherent read operation from system cache 200). From a high-level view, a coherent operation might be divided into four steps: (1) control software updates data stored in system cache 200, some of which might be currently operated on in one of L1 pipeline caches 208; (2) NCA 302 performs a coherent write operation to system cache 200, tracking which bytes of the cache line are changed; (3) NCA 302 sends a configuration message to the corresponding one of L1 pipeline caches 208; and (4) NCA 302 performs a coherent read operation from system cache 200.

For example, NCA 302 might issue an atomic write to system cache 200 with updated data from one of L1 pipeline caches 208. System cache 200 writes the data, while also tracking which bytes of data in a given cache line were written by NCA 302. Each sub-cache 202(1)-202(N) might include address register 318 and byte count register 320. Address register 318 stores the tag and index address of cache lines corresponding to atomic access requests. Byte count register 320 stores the starting and ending bytes within a cache line corresponding to an atomic access. Thus, registers 318 and 320 indicate a contiguous area of a cache line corresponding to an atomic write operation, and prevent the area from being overwritten by non-atomic write operations before the atomic operation is complete. For example, if system cache 200 receives a non-atomic write operation, system cache 200 might process the non-atomic write operation as a read-modify-write (RMW) operation for a given cache line, without changing the bytes of the cache line that were written by the coherent write operation (e.g., the bytes indicated in byte count register 320 for the cache line indicated in address register 318).

In embodiments of the present invention, NCA 302 transmits configuration messages via a configuration ring bus between the accelerators 108. As described in related U.S. patent application Ser. No. 12/782,379, a ring bus of network processor 100 might be a unidirectional bus that passes signals from a source processing module, to a next processing module on the ring bus, with the signals passed module-to-module until a corresponding destination processing module receives the signal.

Figure 5:
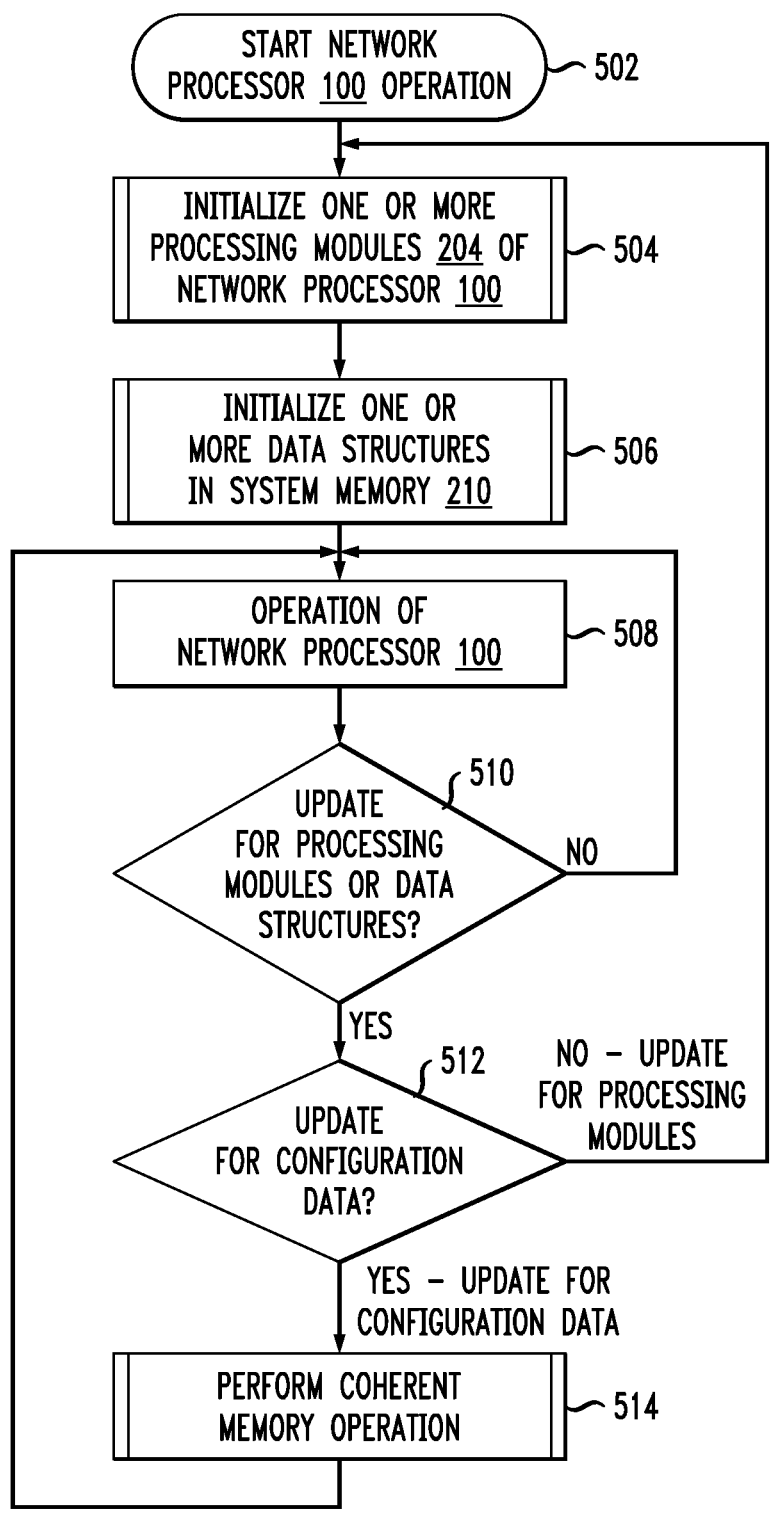
FIG. 5 shows a flow diagram of a configuration process employing the network processor CPU adapter of FIG. 3.

FIG. 5 shows a flow diagram of exemplary initialization process 500 for network processor 100. As shown, initialization process starts at step 502 when network processor 100 first begins operation, for example, at a first powering of network processor 100. At step 504, one or more processing modules 204 of network processor 100 are initialized. Step 504 is described in greater detail subsequently with regard to FIG. 6. At step 506, one or more data structures stored in system memory 210 and employed for operation of network processor 100 are initialized. Step 506 is described in greater detail subsequently with regard to FIG. 7. At step 508, initialization is complete and network processor 100 operates in a normal mode of operation until, at step 510, an update to the configuration of one of processing modules 204 or data structures in system memory 210 is required. At step 512, if the required update is to configuration data stored in system memory 210, processing continues to step 514, where a coherent memory operation is performed on the data stored in system memory 210. Processing then returns to step 508 where network processor 100 operates in a normal mode of operation until, at step 510, an update to the configuration of one of processing modules 204 or data structures in system memory 210 is required. At step 512, if the required update is to configuration of a processing module 204, processing continues to step 504, where one or more processing modules 204 of network processor 100 are re-initialized.

Figure 6:
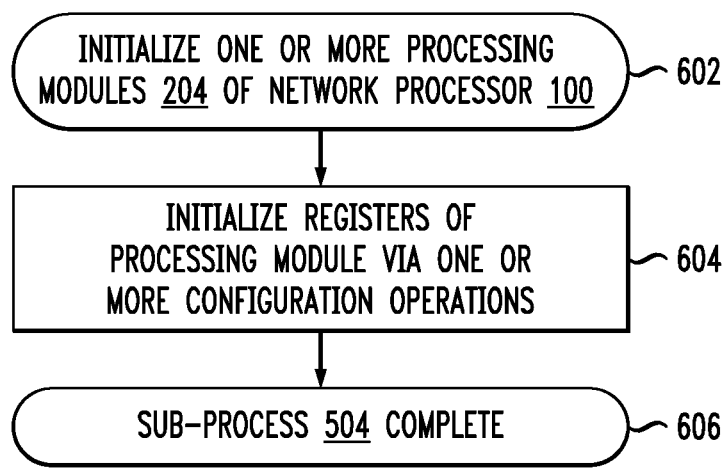
FIG. 6 shows a flow diagram of a processing module initialization sub-process of the configuration process of FIG. 5.

FIG. 6 shows an exemplary sub-process embodiment of step 504 of FIG. 5. As shown in FIG. 6, at step 602, sub-process 504 starts. At step 604, registers in each processing module 204 requiring initialization are updated to include corresponding configuration data by way of one or more configuration ring operations sent from NCA 302 to the corresponding one of processing modules 204. For example, NCA 302 might provide configuration data to a given one of processing modules 204 to assign a given space in system memory 210 to the processing module, among other configuration options. At step 606, sub-process 504 completes.

Figure 7:
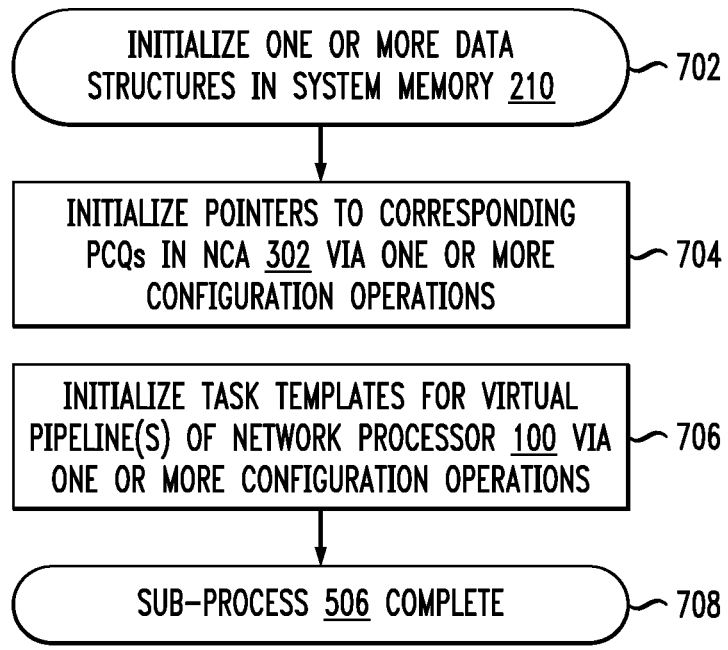
FIG. 7 shows a flow diagram of a data structure initialization sub-process of the configuration process of FIG. 5.

FIG. 7 shows an exemplary sub-process embodiment of step 506 of FIG. 5. As shown in FIG. 7, at step 702 sub-process 506 starts. At step 704, pointers in system memory 210 that point to a corresponding PCQ of NCA 302 are initialized. For example, a given PCQ might be assigned to correspond to configuration requests from a given one of µP cores 106, or to configuration requests destined for a given one of accelerators 108. At step 706, one or more task templates corresponding to given virtual pipelines™ of network processor 100 are defined. For example, as described herein a task template might determine the format of data passed between various of µP cores 106 and accelerators 108, and the task template might further determine an order in which the µP cores 106 and accelerators 108 are to process data of a given task type. At step 708, sub-process 506 completes.

FIG. 8 shows a flow diagram of an exemplary configuration command 800 such as might be employed to perform steps 504 and 506 of FIG. 5. As shown in FIG. 8, at step 802, configuration command process 800 starts, for example when NCA 302 receives a configuration operation request from control software running on one of µP cores 106. At step 804, the corresponding one of µP cores 106 might write configuration command data corresponding to the received configuration operation request to a buffer in system memory 210 (e.g., one of sub-caches 202), and might provide pointers to configuration command data to a PCQ of NCA 302. NCA 302 might generally process received configuration command requests in the order in which they are received at step 806 by reading the pointers from the corresponding PCQ. At step 806, NCA 302 might read the configuration command data from system memory 210 and organize the data into one or more CFG ring commands. At step 808, the data corresponding to each CFG ring command is transferred, on the CFG ring (e.g., one of communication rings 118), to the destination one of processing modules 204. At step 810, if the last CFG command has been sent, then configuration operation 800 completes at step 814. At step 810, if there are more CFG commands remaining to be sent, at step 812, NCA 302 moves to process the next CFG command corresponding to the configuration operation request, and at step 808 the CFG command data is sent to the destination processing module 204 via the CFG ring. Steps 808, 810 and 812 iteratively repeat until all the CFG commands corresponding to a given configuration operation request have been sent to the destination processing module 204.

Process 800 might be iteratively repeated for each configuration operation request received by NCA 302 from one of μP cores 106. In some embodiments, multiple configuration operation requests received by NCA 302 from one of μP cores 106 might be queued by NCA 302, for example in a given PCQ of NCA 302.

Thus, as described herein, embodiments of the present invention provide a method of updating configuration data of a network processor having one or more processing modules and a shared memory. A control processor of the network processor writes updated configuration data to the shared memory and sends a configuration update request to a configuration manager. The configuration update request corresponds to the updated configuration data. The configuration manager determines whether the configuration update request corresponds to settings of a given one of the processing modules. If the configuration update request corresponds to settings of a given one of the one or more processing modules, the configuration manager, sends one or more configuration operations to a destination one of the processing modules corresponding to the configuration update request and updated configuration data. The destination processing module updates one or more register values corresponding to configuration settings of the processing module with the corresponding updated configuration data. Otherwise, if the configuration update request corresponds to configuration data stored in the at least one shared memory, the configuration manager, sends one or more configuration operations to a destination one of the one or more processing modules, and the configuration manager performs a coherent memory update operation corresponding to the configuration data stored in the at least one shared memory.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bit stream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A method of updating configuration data of a network computer processor implemented in an integrated circuit chip, the network computer processor having a control processor, one or more hardware accelerators, and at least one shared memory shared between the control processor and one or more hardware accelerators, the method comprising:

writing, by the control processor of the network computer processor, updated configuration data to the at least one shared memory;

sending, by the control processor, a configuration update request to one or more of the hardware accelerators, wherein the configuration update request corresponds to updated configuration data stored in the at least one share memory;

determining whether the configuration update request corresponds to settings of a given one of the hardware accelerators;

when the configuration update request corresponds to settings of a given one of the hardware accelerators:

updating, by a destination accelerator, one or more register values corresponding to configuration settings of the accelerator with the corresponding updated configuration data of the configuration operations;

otherwise, when the configuration update request corresponds to configuration data stored in the at least one shared memory:

performing, by a combination of multiple parallel processing operations in the at least one shared memory, a coherent memory update operation corresponding to the configuration data stored in the at least one shared memory; and updating one or more task templates of the network computer processor stored in the at least one shared memory, each task template corresponding to a virtual pipeline of the network computer processor, the virtual pipeline defining a processing order of a task through one or more of the hardware accelerators.

2. The method of claim 1, wherein the step of performing a coherent memory update operation corresponding to the configuration data stored in the at least one shared memory further comprises:

sending a coherent memory update request to an accelerator;

if the coherent memory update is a read update:

reading, by the accelerator, modified data corresponding to the coherent memory update from a memory line of the at least one shared memory otherwise, if the coherent memory update is a write update:

performing, by the accelerator, a read-modify-write operation to the at least one shared memory, wherein the read-modify-write operation comprises (i) maintaining data in entries of a memory line of the at least one memory that include data modified by the control processor, and (ii) writing data corresponding to the coherent memory update request to entries in the memory line that include unmodified data.

3. The method of claim 1, wherein, if the configuration update request corresponds to configuration data stored in the at least one shared memory, the method further comprises:

updating one or more pointers stored in the at least one shared memory, wherein the pointers correspond to producer-consumer queues (PCQs).

4. The method of claim 1, wherein the step of sending a configuration update request further comprises:

writing, by the control processor, (i) updated configuration data to the at least one shared memory, the updated configuration data corresponding to the configuration update request, and (ii) one or more pointers corresponding to the updated configuration data to a producer-consumer queue (PCQ), wherein each pointer corresponds to an address of the updated configuration data stored in the at least one shared memory.

5. The method of claim 1, wherein the configuration update request is communicated over a coherent communications bus of the network computer processor, and wherein the one or more configuration operations are communicated over a ring communication bus of the network processor.

6. A non-transitory machine-readable medium, having encoded thereon program code, wherein, when the program code is executed by a machine, the machine implements a method of updating configuration data of a network computer processor implemented in an integrated circuit chip, the network computer processor having a control processor, one or more accelerators and at least one shared memory, the method comprising:

writing, by the control processor of the network computer processor, updated configuration data to the at least one shared memory;

sending, by the control processor, a configuration update request to one or more of the hardware accelerators, wherein the configuration request corresponds to updated configuration data stored in the at least one shared memory;

determining whether the configuration update request corresponds to settings of a given one of the hardware accelerators:

when the configuration update request corresponds to settings of a given one of the hardware accelerators:

updating, by a destination accelerator, one or more register values corresponding to configuration settings of the accelerator with the corresponding updated configuration data of the configuration operations;

otherwise, when the configuration update request corresponds to configuration data stored in the at least one shared memory:

performing, by a combination of multiple parallel processing operations in the at least one shared memory, a coherent memory update operation corresponding to the configuration data stored in the at least one shared memory; and updating one or more task templates of the network computer processor stored in the at least one shared memory, each task template corresponding to a virtual pipeline of the network computer processor, the virtual pipeline defining a processing order of a task through one or more of the hardware accelerators, wherein the configuration update request is communicated over a coherent communications bus of the network computer processor, and wherein the one or more configuration operations are communicated over a ring communication bus of the network computer processor.

7. The non-transitory machine-readable medium of claim 6, wherein the step of performing a coherent memory update operation corresponding to the configuration data stored in the at least one shared memory further comprises:

sending a coherent memory update request to an accelerator;

if the coherent memory update is a read update:

reading, by the accelerator, modified data corresponding to the coherent memory update from a memory line of the at least one shared memory otherwise, if the coherent memory update is a write update:

performing, by the accelerator, a read-modify-write operation to the at least one shared memory, wherein the read-modify-write operation comprises (i) maintaining data in entries of a memory line of the at least one memory that include data modified by the control processor, and (ii) writing data corresponding to the coherent memory update request to entries in the memory line that include unmodified data.

8. The non-transitory machine-readable storage medium of claim 6, wherein, if the configuration update request corresponds to configuration data stored in the at least one shared memory, the method further comprises:

updating one or more pointers stored in the at least one shared memory, wherein the pointers correspond to one or more producer-consumer queues (PCQs).

9. The non-transitory machine-readable storage medium of claim 6, wherein the step of sending a configuration update request further comprises:

writing, by the control processor, (i) updated configuration data to the at least one shared memory, the updated configuration data corresponding to the configuration update request, and (ii) one or more pointers corresponding to the updated configuration data to a producer-consumer queue (PCQ), wherein each pointer corresponds to an address of the updated configuration data stored in the at least one shared memory.

10. A network computer processor implemented in an integrated circuit chip, the network computer processor comprising:

at least one shared memory;

one or more hardware accelerators;

one or more control processors configured to (i) provide updated configuration data to the at least one shared memory, (ii) send a configuration update request to a configuration manager of the network processor, wherein the configuration update request corresponds to updated configuration data stored in the at least one shared memory;

wherein the configuration manager is configured to determine whether the configuration update request corresponds to settings of a given one of the one or more hardware accelerators:

when the configuration update request corresponds to settings of a given one of the one or more hardware accelerators:

the configuration manager is further configured to send one or more configuration operations to a destination one of the one or more hardware accelerators, wherein the one or more configuration operations correspond to the configuration update request and updated configuration data; and the destination processing module is configured to update one or more register values corresponding to configuration settings of the hardware accelerator with the corresponding updated configuration data of the one or more configuration operations;

otherwise, when the configuration update request corresponds to configuration data stored in the at least one shared memory:

the configuration manager is further configured to (i) send one or more configuration operations to a destination one of the one or more hardware accelerators, wherein the one or more configuration operations correspond to the configuration update request and data stored in the destination hardware accelerator, and (ii) perform, by a combination of multiple parallel processing operations in the at least one shared memory, a coherent memory update operation corresponding to the configuration data stored in the at least one shared memory, wherein the control processor is configured to update one or more task templates of the network computer processor stored in the at least one shared memory, each task template corresponding to a virtual pipeline of the network computer processor, the virtual pipeline defining a processing order of a task through one or more of the hardware accelerators.

11. The network computer processor of claim 10, wherein:

the control processor is further configured to (i) write updated configuration data to the at least one shared memory, the updated configuration data corresponding to the configuration update request, and (ii) write one or more pointers corresponding to the updated configuration data to a producer-consumer queue (PCQ) of the configuration manager, wherein each pointer corresponds to an address of the updated configuration data stored in the at least one shared memory; and the configuration manager is further configured to (i) update one or more pointers stored in the at least one shared memory, wherein the pointers correspond to one or more PCQs of the configuration manager, (ii) update one or more task templates of the network computer processor stored in the at least one shared memory, wherein each task template corresponds to a virtual pipeline of the network processor, the virtual pipeline defining a processing order of a task through one or more of the one or more hardware accelerators, (iii) read the updated configuration data from the at least one shared memory based on the one or more pointers in the PCQ, (iv) group the updated configuration data into one or more configuration operations, and (v) provide the one or more configuration operations to the destination hardware accelerator.

12. The network computer processor of claim 10, wherein the configuration manager comprises:

a logic unit configured to control operation of the configuration manager, the logic unit comprising: (i) at least one finite state machine, (ii) a data buffer configured to temporarily store the updated configuration data read from the at least one shared memory, and (iii) one or more producer-consumer queues (PCQs) configured to store pointers to updated configuration data in the at least one shared memory;

an interface to the at least one shared memory through a switch of the network computer processor;

an interface to at least one ring communications bus of the network computer processor, the at least one ring communications bus coupled to the one or more processing modules;

an interface to at least one coherent processor bus of the network computer processor, the coherent processor bus coupled to the at least one control processor;

an interrupt interface to the at least one control processor of the network computer processor, the interrupt interface configured to generate interrupts to the control processor based on one or more configuration operations;

and a debug interface configured to transfer debugging data between and a debugging device external to the network processor, wherein the configuration update request is communicated from the at least one control processor to the configuration manager over the coherent processor bus, and wherein the one or more configuration operations are communicated from the configuration manager to the one or more hardware accelerators over the at least one ring communication bus.

13. The network processor of claim 10, wherein the one or more control processors comprise Reduced Instruction Set Computing (RISC) central processing units (CPUs).

14. The network computer processor of claim 10, wherein the at least one shared memory comprises at least one of an embedded DRAM and a double data rate (DDR) DRAM coupled to the network processor.

* * * * *